Patented June 15, 1943

2,321,627

UNITED STATES PATENT OFFICE 2,321,627

PHENOL-FORMALDEHYDE RESIN

Henry S. Rothrock, Wilmington, Del., assignor to E. I. du Pont de Nemours & Company, Wilmington, Del., a corporation of Delaware No Drawing. Application October 10, 1940, Serial No. 360,680

5 Claims. (Cl. 260—51)

This invention relates to synthetic resins and more particularly to phenol-formaldehyde resins.

Phenol-formaldehyde resins have been long known and used in many applications. These resins, however, when prepared from the commonly used phenols such as phenol itself, metacresol or xylenol are generally hard, brittle and of poor color and durability, and are often insoluble in hydrocarbon solvents. They also lack the toughness required for many applications. Improved color and durability have been obtained by condensing aldehydes with certain polyphenols such as bis-(hydroxyphenyl)-dimethylmethane but the films obtained from such resins are undesirably brittle.

This invention has as an object the production of new and useful synthetic resins. A further object is the manufacture of improved phenol-formaldehyde resins of improved properties, particularly with respect to increased flexibility, solubility and toughness. A still further object is the production of improved coating and other compositions comprising these resins. Other objects will appear hereinafter.

The above objects are accomplished by reacting a suitable aldehyde, particularly formaldehyde, with bis-(hydroxyphenyl)-alkanes in which the hydroxyphenyl nuclei are separated by a chain or more than 5 carbon atoms. Examples of phenols of this kind are 1,5-bis(hydroxyphenyl)pentane and 1,12-bis(hydroxyphenyl) octadecane. These phenols are conveniently prepared by reacting the corresponding diol with excess phenol in the presence of a dehydrating agent such as zinc chloride or sulfuric acid, or in the presence of a catalyst such as boron trifluoride or hydrogen fluoride, etc.

The resins of this invention are generally made from a phenol of the above mentioned type by the following procedure: The phenol is mixed with about 1½ times the equivalent amount of formalin and the mixture heated at 90 to 95° under reflux. To this mixture is then added 0.3 to 0.5% sodium hydroxide (based on the phenol) and the heating carried to a point just preceding the production of an insoluble resin (this point determined by a previous trial run). The mixture is then poured into water and the precipitated resin washed with hot water until free of alkali. The resin is dried at 60 to 80° under reduced pressure and then dissolved in a suitable solvent (in most cases butanol).

These resins in butanol solution when cast into films and baked yield insoluble products of exceptional toughness in comparison with ordinary phenol-formaldehyde type resins.

The following examples are illustrative of methods for practicing the invention:

Example I

A mixture of 22 parts of 1,12-bis-(hydroxyphenyl)octadecane, 16.2 parts of 32% formalin, 1 part of sodium hydroxide in 5 parts of water, and 25 parts of alcohol was placed in a vessel and heated under reflux for 2 hours. After one hour the originally clear solution had become turbid. The mixture was poured into water and washed several times with additional water. The product was dehydrated by heating at 95° under a vacuum. The resulting light tan, taffy-like resin (25.8 parts), which was soluble in butanol and high-flash naphtha, was dissolved in 40 parts of warm butanol.

A film was cast of this solution and baked at 100° for one hour, then at 140° for one hour, to give a tough, hard film which had also somewhat rubbery properties. After soaking overnight in water the film was still tough and hard.

The diphenol used in the above example was made by the following procedure: A mixture of 33 parts of recrystallized 1,12-octadecanediol, 80 parts of phenol, and 31.5 parts of zinc chloride was placed in a vessel, heated and stirred at 160° C. for 6½ hours. The mixture was cooled, washed 7 times with 85 parts of water and steam distilled to remove the phenol. The residue was diluted with equal parts of methanol, 5 parts of deodorized charcoal added and the mixture filtered warm. After removal of the methanol the diphenol was obtained by distillation from the crude material. It boils at 250-270° at 1 mm. pressure. This material is apparently the 1,12-(hydroxyphenyl)octadecane though there is a possibility that some of it rearranges during the reaction so that a portion of the final product may have the hydroxyphenyl nuclei on other carbon atoms.

Example II

A mixture of 5 parts of 1,5-bis-hydroxyphenyl)pentane, 4.8 parts of 32% formalin, 0.05 part of sodium hydroxide in just enough water for solution and 5 parts of alcohol was heated for 8 hours at 80° C. The acidified reaction product was poured into water, the oily layer separated, washed with several portions of water and dried under reduced pressure at room temperature for 1 hour. This produced 5.7 parts of a viscous oil which was dissolved in an equal volume of butanol.

A film was prepared from the solution and baked 1 hour at 100° and 1 hour at 140° to give a film which was much tougher than ordinary phenol-formaldehyde resin but not as tough as the resin in Example I.

*Example III*

Sateen cloth, 40" wide, 1.48 yds. of which weighed 1 lb., was coated to the extent of about 7.0 ounces per yard with a composition comprising 49 parts of an interpolyamide prepared from hexamethylene diammonium adipate and caprolactam in a 60:40 ratio, 36.75 parts bis-(hydroxyphenyl) octadecane, 12.25 parts of a condensation product of propylene glycol with castor oil and 2% carbon black. A sample of this coated material was soaked for 1 hour at room temperature in 37% formalin containing 0.01% sodium hydroxide, allowed to dry at room temperature for 16 hours and then thoroughly rinsed with warm water. After aging 3 weeks at room temperature, the appearance of the sample was unchanged when 1 cc. of 50% aqueous ethanol was allowed to evaporate from the resinous surface. In contrast a sample of the coated fabric which had not been subjected to the formaldehyde treatment was badly whitened and permanently scarred when similarly treated with 50% aqueous ethanol.

A similar effect was noted when the aqueous formalin was brushed on the coated cloth and the cloth then baked 1 hour at 125° C.

A large variety of diphenols in which the hydroxyphenyl nuclei are separated by more than 5 carbon atoms are applicable in the present invention. The connecting chain may be composed entirely of methylene groups as 1,6-bis-(hydroxyphenyl)-hexane, 1,10-bis-(hydroxyphenyl)-decane, 2,9-bis-(hydroxyphenyl)-decane. The chain may contain lateral substituents, e. g. of aliphatic, aromatic, hydroaromatic, and alicyclic character. Examples of these are 1,10-bis-(hydroxyphenyl)-5-ethyl octadecane, 1,6-bis-(hydroxyphenyl)-3-cyclohexyl hexane, 1,6-bis-(hydroxyphenyl)-3-phenyl hexane, 1,12-bis-(hydroxyphenyl)-6-cyclohexenyl octadecane. While in general those phenols whose hydroxyl groups are para to the point of attachment of the alkane chain are more available, phenols which are connected in other positions are also applicable, e. g. 1,10-bis-(o-hydroxyphenyl)-decane. The hydroxyphenyl nuclei may be connected by chains which are in part aromatic, e. g. omega, omega'-bis-(p,p'-hydroxyphenyl) p-xylene,

Mixtures of phenols may also be used in the preparation of the products of this invention.

Although formaldehyde, which is intended to refer also to formaldehyde-yielding compounds, is the preferred and most readily available compound, other aliphatic aldehydes, such as acetaldehyde, isobutyraldehyde, valeraldehyde and heptaldehyde, benzaldehyde, phenylacetaldehyde, furfural, etc. may be used. The increasing sluggishness of the reactions in the case of the higher aldehydes makes their use less desirable, and it may be said in general that aldehydes of more than seven carbon atoms are less preferred. Mixtures of aldehydes, such as of formaldehyde with one or more higher aldehydes, can be used. Aliphatic aldehydes are preferred, and, of these, formaldehyde is the most useful. Formaldehyde is usually used in the ratio of three mols of it to 1 mol of the diphenol but it is quite possible to use lower or higher amounts of formaldehyde, for example, as low as one or as much as four or even more of formaldehyde per mol of diphenol. The lower ratios of formaldehyde result in resins with less tendency to heat harden, while the use of excessively high amounts results in having unreacted aldehyde at the end of the reaction.

As solvents in this reaction alcohol is used in most instances, particularly when formalin is used. When there is no excess water, e. g. when paraformaldehyde serves as the source of formaldehyde, hydrocarbon solvents can be used. The choice of solvent is not, however, an essential part of this invention, and any suitable solvent can be used. The reaction can also be carried out without a solvent.

In general it is convenient to use temperatures in the range of 95 to 100° C. The reaction may, however, be carried out within a wide temperature range, for example, from room temperature up to 200° C. or even higher. At low temperatures it is generally necessary to use a larger amount of catalyst in order to effect the reaction and at higher temperatures care must be taken to avoid the production of an insoluble product.

The production of films and the subsequent hardening can be carried out in many conventional ways. In general, the resins of this invention are more useful as baking finishes than as air drying finishes. However, by modification of these resins with drying oils according to usual practices, suitable coating compositions can be obtained which will dry in air. In the baking of these resinous materials the temperatures are usually from 100° to 140° C. Numerous ingredients can be added to catalyze the hardening of the films. Small amounts of acids or alkalies act as catalysts in the hardening of these resins. When these resins are modified with drying oils, addition of oil-soluble salts of various metals such as cobalt, manganese, lead, iron and zinc, which have been shown to have definite siccative properties, is useful.

Because of the toughness and flexibility of the resins made according to this invention, they have considerable use in various applications. Compositions comprising the present resins may include pigments, natural resins, other synthetic resins, nylons, plasticizers, inhibitors, waxes, fillers, solvents, catalysts and the like. Examples of suitable natural resins include shellac, damar, congo, copal, and rosin. As examples of synthetic resins there may be mentioned unmodified or drying oil modified alkyd resins, ethyl cellulose, pyroxylin, cellulose esters, polyvinyl esters, polyacrylates and polymethacrylates, polystyrene, polyvinyl alcohol, polyvinyl chloride, polyvinyl acetate, urea-formaldehyde resins, polyvinyl acetal, amine-formaldehyde resins, hydrogenated rosin, phenolic resin modified rosin and the like. Such drying oils as linseed oil and tung oil, semi-drying oils such as soya bean oil and non-drying oils such as castor and coconut oils are also suitable in certain compositions. Suitable fillers adapted for use in coating, molding compositions and the like include materials such as aluminum powder, wood flour, ground cork, and mica. When the coating composition is a varnish or enamel, it is sometimes advisable to add anti-gelling, anti-settling or anti-skinning agents such as hydroquinone, cresol or pine oil. For some uses it is advantageous to incorporate such waxes as paraffin wax, beeswax, carnauba wax, montan wax, hydroxy-stearin and the like.

The present resins are also advantageously used, with or without other ingredients, as adhesive compositions for joining together wood, paper, cellulose, earthenware and the like. The coating, adhesive, and impregnating compositions can be used either directly or over a suitable base coat on such materials as rubber, paper, leather, glass, cloth, wood, metal or molded synthetic resin.

As many apparently widely different embodiments of this invention may be made without departing from the spirit and scope thereof, it is to be understood that I do not limit myself to the specific embodiments thereof except as defined in the appended claims.

I claim:

1. A resin comprising the reaction product of an aldehyde and bis-(hydroxyphenyl)-octadecane in which the hydroxyphenol nuclei are separated by a chain of more than 5 carbon atoms.

2. A process for making resins which comprises reacting an aldehyde with bis-(hydroxyphenyl)-octadecane in which the hydroxyphenyl nuclei are separated by a chain of more than 5 carbon atoms.

3. The resin set forth in claim 1 in which said aldehyde is formaldehyde.

4. The process set forth in claim 2 in which said aldehyde is formaldehyde.

5. A resin comprising the reaction product of formaldehyde and 1,12-bis(hydroxyphenyl)octadecane.

HENRY S. ROTHROCK.